United States Patent

[11] 3,619,715

[72] Inventor Sang-Chul Kim
Cleveland Heights, Ohio

[21] Appl. No. 39,418
[22] Filed May 21, 1970
[45] Patented Nov. 9, 1971
[73] Assignee General Electric Company

[54] RESISTOR CIRCUIT FOR SEQUENTIALLY FLASHING PHOTOFLASH LAMPS
12 Claims, 5 Drawing Figs.

[52] U.S. Cl. 315/232, 95/11.5, 240/1.3, 315/241 P, 431/95
[51] Int. Cl. H05b 37/00
[50] Field of Search 240/1.3; 431/95; 95/11.5; 315/232, 241 P

[56] References Cited
UNITED STATES PATENTS
3,518,487 6/1970 Tanaka et al. ................ 315/232

*Primary Examiner*—John Kominski
*Attorneys*—Norman C. Fulmer, Henry P. Truesdell, Frank L. Neuhauser, Oscar B. Waddell and Joseph B. Forman

ABSTRACT: A resistor circuit for causing sequential flashing of photoflash lamps from pulses of electrical energy. Resistors are successively connected in series between the individual photoflash lamps, and additional resistors are connected across portions of the aforesaid series combination of resistors and function to equalize the firing pulse energy successively applied in turn to each lamp.

Fig. 1.
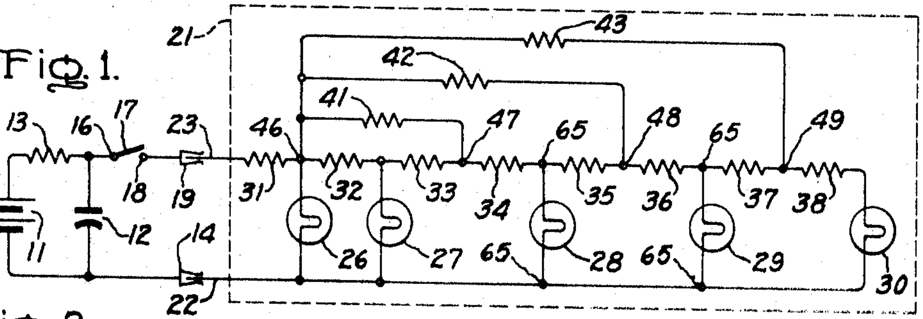
Fig. 2.
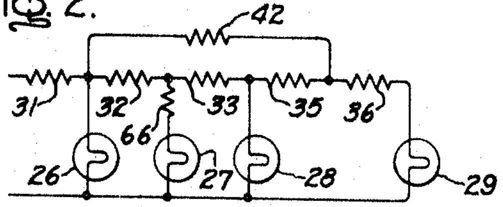
Fig. 3.
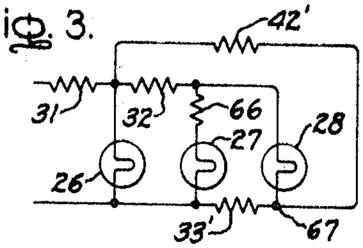
Fig. 4.
| ENERGY PER LAMP PER FLASHING – MILLIJOULES | | | | | |
|---|---|---|---|---|---|
| LAMPS IN CIRCUIT | #1 LAMP FLASHING | #2 LAMP FLASHING | #3 LAMP FLASHING | #4 LAMP FLASHING | #5 LAMP FLASHING |
| 1 | 2.5 | | | | |
| 2 | .529 | 2.5 | | | |
| 3 | .072 | .372 | 2.5 | | |
| 4 | .023 | .110 | .337 | 2.5 | |
| 5 | .00 | .009 | .034 | .158 | 2.8 |
Fig. 5.
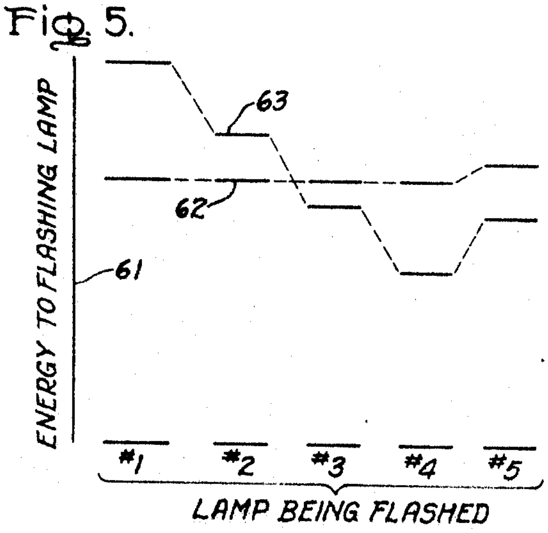
Inventor:
Sang-Chul Kim
by Norman C. Fulmer
His Attorney

RESISTOR CIRCUIT FOR SEQUENTIALLY FLASHING PHOTOFLASH LAMPS

BACKGROUND OF THE INVENTION

The invention is in the field of electrical circuitry for sequentially flashing photoflash lamps, and is particularly useful with a unitary array of flash lamps, such as three or four or more lamps arranged to radiate their light in the same direction when they are sequentially flashed, so that the array need not be moved nor removed until all of its lamps have been flashed.

Numerous circuits have been devised for successively flashing photoflash lamps by pulses of electrical energy such as are obtained from a battery through a momentarily closed switch or from a capacitor which has been charged through a resistor from a battery, or from some other suitable energy source. Such a pulse of electrical energy usually is initiated by closure of a switch associated with the shutter mechanism of a camera. A type of circuit heretofore proposed employs mechanically actuated switches for applying the electrical pulses to successively different flashbulbs; another type of circuit utilizes heat-responsive or light-responsive means associated with the flash lamps and adapted to actuate switching means for connecting the pulse source to successively different flash lamps as each lamp becomes flashed; and a further type of circuit utilizes transistors or thyristors for automatically connecting the pulse source to successively different flash lamps as each lamp becomes flashed.

Another previously proposed circuit employs resistors successively connected in series with a plurality of individual flash lamps, so that the lamps are connected in electrical parallel through flashed resistors. The firing pulse source is connected to an end of the circuit, whereby each flash lamp is connected across the pulse source through successively greater resistance. The first pulse flashes the nearest lamp, which becomes an open circuit upon flashing, whereupon the next pulse flashes the next lamp, etc. In order to insure flashing of only one flash lamp (the nearest unflashed lamp to the pulse source) per firing pulse, it is desirable that the series resistors have relatively large values of resistance as compared to the resistances of the flash lamp filaments. On the other hand, low values of series resistances are desired, because large values of series resistance consume relatively large amounts of energy from the firing pulse to that it is desirable to provide a greater amount of firing pulse energy to insure that all of the lamps can be flashed. It has been found that this dilemma of desiring larger resistance values for one reason, and smaller resistance values for another reason, is not easy to resolve satisfactorily for insuring that only one flash lamp will flash per firing pulse and also that the energy per pulse will be capable of successively flashing all of the lamps of the array, with an economically feasible value of firing pulse voltage. These difficulties tend to offset an important advantage of the resistance network circuit: its low cost, so that the resistor circuit can be included in a throw-away multiple lamp unit, whereby only two electrical connections need be provided between the multiple lamp unit and the camera or flash adaptor with which it is used.

The reliability of the above-described resistance sequential flashing circuit can be improved if the flash lamps of the array have differing filament resistances, the lamp nearest the firing pulse source having the lowest filament resistance and the remaining lamps having successively higher values of filament resistance. However, this expedient suffers the disadvantage of higher costs of manufacturing the different-resistance lamps and of keeping track of which lamps have which filament resistance during storage and during assembly into the flash array. Another disadvantage of an array in which the lamps have differing filament resistances, is a reduction of flashing reliability because some of the lamps will not have optimum filament resistance for being flashed from the firing pulse.

SUMMARY OF THE INVENTION

Objects of the invention are to provide an improved resistance type of circuit for sequentially flashing flashbulbs to provide such a circuit which is free from the above-described disadvantages of prior resistance circuits; and to provide such a circuit that is low in cost and highly reliable in operation.

The invention comprises, briefly and in a preferred embodiment, a plurality of photoflash lamps intended to be sequentially flashed by a sequential series of firing voltage pulses, resistors successively connected in series between the lamps so that the lamps are connected in electrical parallel through the resistors, and one or more additional resistors connected across portions of the aforesaid series combination of resistors, each of the additional resistors being connected between points on different ones of the series resistors. The firing voltage pulse source is connected across an end of the lamp-resistor circuit. The additional resistors have values of resistance such that they equalize the amount of pulse energy that is successively applied in turn to each lamp for causing flashing thereof, thereby improving the reliability of flashing a single flashbulb upon each occurrence of a firing voltage pulse.

BRIEF DESCRIPTION OF THE DRAWING

In the drawing,

FIG. 1 is an electrical schematic drawing of a preferred embodiment of the invention;

FIGS. 2 and 3 show modifications of the circuit of FIG. 1 in accordance with the invention;

FIG. 4 is a table of firing pulse energies applied to the lamps of the circuit of FIG. 1 upon the successive flashing of each lamp thereof; and FIG. 5 is a comparative plot of firing pulse energy applied to the successive lamps as they are flashed, for the circuit of FIG. 1 and for a prior art resistor circuit.

DESCRIPTION OF THE PREFERRED EMBODIMENT

In the circuit of FIG. 1, a battery 11 is connected to a charge a capacitor 12 through a resistor 13. In a preferred arrangement, the battery 11 has a voltage of 9 volts, the capacitor 12 has a capacitance of 1,000 microfarads, and the resistor 13 has a resistance of 1,000 ohms. One terminal of the capacitor 12 is connected to a connector plug terminal 14, and the other terminal of capacitor 12 is connected to a terminal 16 of a switch 17, the other terminal 18 thereof being connected to a second connector plug terminal 19. The switch 17 is adapted to be momentarily closed in synchronization with the opening of a camera shutter, in well-known manner. The circuitry thus far described functions as a source of electrical energy pulses for flashing photoflash lamps, and may be incorporated in a camera, or in a flash attachment for use with a camera. Although the firing pulse is sometimes called a "voltage" pulse, it is a primarily the energy of the pulse, comprising the combination of voltage, current, and time duration, that causes a lamp to flash.

A flash lamp array unit 21 is provided with a pair of connector prongs 22 and 23 adapted for electrical engagement with the terminals 14 and 19, respectively. The unit 21 contains a plurality of photoflash lamps 26 through 30 which may be of conventional type, such as General Electric type AG-1, each containing a filament provided with electrical connection lead wires and adapted for initiating a flash of combustible material contained within the bulb. One end of the filaments of each of the lamps 26–30 is connected to the connector prong 22. The other ends of the filaments of lamps 26–30 are successively connected, through a series of resistors 31 through 38, to the connector prong 23. The pairs of resistors 33 and 34, 35 and 36, and 37 and 38, may each be considered as a pair of resistors connected in series, or as a single resistor provided with a tap. Thus, in effect, the lamps 26–30 are connected in a parallel combination through the resistors 32–38, this parallel combination being adapted for connection to the source of energy pulses at the terminals 14 and 19, each successive lamp being connected to the pulse source through a successively greater total value of resistance.

Additional resistors 41, 42, 43 are respectively connected between the junction 46 of resistors 31 and 32 and the junction 47 of resistors 33 and 34; the junction 48 of resistors 35 and 36; and the junction 49 of resistors 37 and 38. Thus, the resistors 41, 42, and 43 are respectively connected from a filament lead of the first flash lamp 26, to points of the resistances that are respectively connected in series between the flash lamps 27, 28, 29, and 30. The series-connected resistors 31–38 may be individual resistors, or may constant of a single resistor tapped for having connections made thereto at suitable points thereon. Preferably all of the resistors 31–38 and 41–43 are provided as a small size integrated circuit.

Preferably the lamps 26–30 of the array 21 are provided with individual reflectors, and arranged to radiate the light emitted therefrom in the same direction. If desired, another combination of lamps and resistors may be provided in the unit 21, for radiating the light emission in the opposite direction, so that when all of the lamps at the front of the unit have been flashed, the unit may be turned around so that the rear array of lamps will then face frontwardly, for obtaining an additional number of flashes from a single unit. Other connector prongs similar to 22 and 23 could be provided for connecting the rear array of lamp circuitry to the connectors 14 and 19 when the unit is turned around so that the "rear" array of flash lamps faces frontwardly.

If desired, the flash array unit 21 may be removed from the camera or flash adaptor after some of its lamps have been flashed, and reinserted at a later time for flashing the remaining lamps. After the lamps have been flashed, the array unit 21 may be discarded.

The circuit of FIG. 1 functions as follows. Upon a momentary closing of the switch 17, in synchronization with the opening of a camera shutter, the electrical energy stored in the capacitor 12 (40 millijoules for a 1,000 microfarad capacitor charged to 9 volts) discharges into the circuit of the lamp unit 21, in the form of an electrical pulse having an approximately exponential decay characteristic. Most of the capacitor's electrical energy discharges through the filament of the first lamp 26, and a portion of the energy flows through the filament of lamp 27 via the resistor 32; the voltage drop across the resistor 32 partially limits the amount of electrical energy discharged through the filament of lamp 27. The remaining series resistors 333–38 in the circuit further limit the amount of energy discharged into the remaining flash lamps. At the same time, portions of the firing pulse energy flow through the resistors 41, 42, and 43, to the points 47, 48, 49, and thence through the adjacent series resistances and filaments of the remaining lamps, to the return connector prong 22. As the portion of the electrical energy of the pulse from capacitor 12 discharges through the filament of lamp 26, the filament resistance (which initially is about 0.6 ohms) increases as the filament becomes incandescent, and the filament burns out and becomes an open circuit as the lamp flashes. The moment at which the lamp 26 flashes and its filament becomes an open circuit, is a critical moment at which the next lamp 27 is most likely to undesirably flash, because when the filament of lamp 26 becomes an open circuit the remaining energy in capacitor 12, minus the voltage drop provided by the resistor 32, is available for the remaining lamps. However, at this moment the energy remaining in capacitor 12 has been reduced, due to portions of the firing pulse energy drained off through resistors 32, 41, 42, and 43, to a value such that it cannot cause the next lamp 27 to undesirably flash.

Upon the next momentary closing of the switch 17, in synchronization with the opening of the camera shutter, most of the electrical discharge pulse energy from the capacitor 12 flows through the second flash lamp 27, since the first lamp 26 now is an open circuit. Then energy discharge through lamp 27 is reduced slightly by the voltage drop across the resistor 32 and also is reduced by portions of the energy flowing through the resistors 42 and 43, but is ample for causing the lamp 27 to flash. The portion of firing pulse energy flowing through resistor 41 may contribute an amount of firing pulse energy to the flashing lamp 27 (via resistor 33), depending on the relative values of resistors 33 and 34. The resistors 33–38 reduce the voltage, and hence energy, flowing to the remaining lamps so that they will not flash when the second lamp 27 flashes. When the third lamp 28 is flashed, the resistor 41 is in shunt with the resistors 32 and 33, thereby increasing the firing energy to lamp 28 over what it would be without the presence of resistor 41. The remaining resistors function similarly as described in connection with the flashing of the first and second lamps 26 and 27. When the fourth lamp 29 is flashed, resistors 41 and 42 are both in shunt with portions of the combination of series resistors 32–38, and when the fifth lamp 30 is flashed, all three resistors 41, 42, and 43 are in shunt with portions of the combination of series resistors 32–38, whereby these fourth and fifth lamps 29 and 30 receive greater amounts of firing pulse energy than if the resistors 41–43 were omitted.

Another way of stating the above-described functioning of the resistor network, is that the shunt resistors 41, 42, and 43 function to drain off some of the firing pulse energy through "later" lamps when the "earlier" lamps 26–29 are being flashed, this drain-off of pulse energy being greatest when the first lamp is flashed and becoming relatively less as the successive lamps are flashed. The shunt resistors also function to relatively increase the amount of firing pulse energy that is delivered to the "late" lamps to be flashed, due to their shunt connections across portions of the series resistors 32–38, this relative increase becoming greater as more lamps are flashed and hence more of the resistors 41–43 function in shunt with the series resistors 32–38.

The beneficial achievement of the invention will now be further described, for a circuit of FIG. 1 in which each of the flash lamps 26–30 has a filament resistance of about 0.6 ohms, and in which the resistors have the following values of resistance:

| | |
|---|---|
| Resistor 31 | 6.28 ohms |
| Resistor 32 | 1.60 ohms |
| Resistor 33 | 3.32 ohms |
| Resistor 34 | 2.13 ohms |
| Resistor 35 | 7.08 ohms |
| Resistor 36 | 6.75 ohms |
| Resistor 37 | 4.12 ohms |
| Resistor 38 | 4.40 ohms |
| Resistor 41 | 16.00 ohms |
| Resistor 42 | 4.12 ohms |
| Resistor 43 | 32.30 ohms |

FIG. 4 of the drawing is a tabulation of firing pulse energy per lamp per flashing, for such a circuit. The first column shows the firing pulse energy applied to each of the five lamps when the first lamp 26 is being flashed, the second column shows the firing pulse energy applied to each of the remaining four lamps when the second lamp 27 is being flashed, etc. As shown by the table, each of the lamps being flashed receives 2.5 millijoules of pulse energy except for the last lamp 30 which receives 2.8 millijoules, this slightly larger energy being due to the fact that there are no other unflashed lamps for draining off a portion of the pulse energy. In addition to indicating the uniformity of firing pulse energy applied to each lamp to be flashed, the table also shows that the energy applied to a lamp to be flashed is at least about five times that applied to any other lamp during each flashing sequence, thus indicating a high reliability of flashing a single lamp upon each occurrence of a firing pulse.

In FIG. 5, the vertical axis 61 represents firing pulse energy applied to the lamp to be flashed, versus a horizontally arranged representation of the five lamps of an array. The plot 62 indicates, in solid lines, the pulse energy applied sequentially to each of the lamps to be flashed, which is approximately 2.5 millijoules per lamp as shown in the table of FIG. 4. For comparison, the plot 63 indicates, in solid lines, the firing pulse energy that would be applied sequentially to each of the lamps to be flashed if the shunt resistors 41, 42, and 43 were omitted. For convenience, the ends of the solid portions of each of the plots 62 and 63 are connected by dashed lines. These plots indicate the uniformity of firing pulse energy applied to each lamp to be flashed in accordance with the invention (plot as compared with a prior art type of circuit (plot 63). A way of explaining the desirability of uniform firing energy, per plot 62, is that when the first lamp of plot 63 is fired, its filament will burn out very quickly due to the high energy level, thus leaving considerable remaining energy which will tend to undesirably flash the second lamp.

The circuit modification of FIG. 2 indicates how the number of shunt resistors can be reduced, by adding a resistor in series with one or more of the flash lamps. FIG. 2, insofar as different from FIG. 1, eliminates the shunt resistor 41 and the series resistor 34 of FIG. 1, and adds a resistor 66 in series with the second lamp 27. The resistor 66 functions to help reduce the firing pulse energy to the second lamp 27, and hence prevent it from flashing, when the first lamp 26 is being flashed. FIG. 3 illustrates a further modification, in which the series resistor 33 of the "top" line is placed in the "bottom" line at 33′, and the shunt resistor 42 of FIG. 2 is replaced by a resistor 42′ in FIG. 3 connected to the junction 67 of resistor 33′ and lamp 28.

The first series resistor 31 in FIGS. 1, 2, and 3 helps to reduce the firing pulse energy applied to the first lamp 26, thus reducing the likelihood of the second lamp 27 undesirably flashing due to the excess firing pulse energy remaining after the first lamp flashes, but could be omitted if desired.

The circuitry of the invention can be incorporated into a camera or flash adapter instead of in a disposable flash array, with the requisite number of electrical connectors being provided for connecting the filament lead wires of the lamps 26, etc., of the array respectively to the different connection terminal points 65 of the series resistors 32–38.

While a preferred embodiment of the invention, and modifications thereof, have been shown and described, other embodiments and modifications thereof will become apparent to persons skilled in the art, and will fall within the scope of invention as defined in the following claims.

What I claim as new and desire to secure by letters Patent of the United States is:

1. A circuit for causing a plurality of photoflash lamps to be flashed sequentially by sequential firing energy pulses, said circuit comprising a plurality of pairs of connections terminal points adapted for electrical connection thereto of respective individual lamps of said plurality of flash lamps, wherein the improvement comprises a plurality of series resistance means successively connected in series between said pairs of terminal points to connect said pairs of terminal points into an electrical parallel circuit through said resistance means, a first pair of said terminal points being adapted for connection to a source of said firing pulses, and at least one additional resistance means connected between a point of one of said series resistance means and a point of another said series resistance means.

2. A circuit as claimed in claim 1, in which said first pair of terminal points is at an end of said electrical parallel circuit, and in which one of said additional resistance means is connected between the terminal point of said first pair to which a series resistance means is connected and a point of the series resistance means that is connected between the second and third said pairs of connection terminal points.

3. A circuit as claimed in claim 2, in which other ones of said additional resistance means are respectively connected between said terminal point of the first pair and points of each of the series resistance means that are connected between the pairs of connection terminal points subsequent to said third pair of connection terminal points, said additional resistance means having values of resistance such as to substantially equalize the firing pulse energies applied to lamps to be flashed when flash lamps are connected across said pairs of terminal points.

4. A circuit as claimed in claim 3, in which said connections of said additional resistance means to said points of the series resistance means are made at points intermediate the ends of the series resistance means.

5. A circuit as claimed in claim 3, including further resistance means connected at a said first pair of terminal points so as to be in electrical series between said first pair of terminals points and said source of firing pulses when said circuit is connected thereto.

6. A circuit as claimed in claim 1, in which said first pair of terminal points is at an end of said electrical parallel circuit, and in which one of said additional resistance means is connected between the terminal point of said first pair to which a series resistance means is connected and a point of the series resistance means that is connected between the third and fourth said pairs of connection terminal points, said circuit further including a resistance means connected at a terminal point of said second pair of connection terminal points so as to be in electrical series with a lamp when said lamp is connected to said second pair of connection terminal points.

7. A circuit for causing a plurality of photoflash lamps to be flashed sequentially by sequential firing energy pulses, said circuit comprising at least three pairs of connection terminal points adapted for electrical connection thereto of respective individual lamps of said plurality of flash lamps, wherein the improvement comprises means adapted for connecting a terminal point of each of said pairs to a source of said firing energy pulses, resistance means connected between the remaining terminal points of said first and second pairs, resistance means connected between said remaining terminal point of the second pair and the remaining terminal point of said third pair, resistance means connected between said remaining terminal point of the first pair and a point of said resistance means that is connected between the remaining terminal points of the second and third pairs, and means adapted for connecting said remaining terminal of the first pair to said source of firing pulses.

8. A circuit as claimed in claim 7, in which said last-named means includes a resistance.

9. A disposable unitary array of photoflash lamps including circuitry for causing said lamps to be flashed sequentially by sequential firing energy pulses, each of said lamps containing a filament for initiating flashing of the lamp and adapted to become an open circuit when said flashing occurs, wherein the improvement comprises connection means including resistance means successively connected in series between the filaments of said lamps to connect the filaments into an electrical parallel circuit through said resistance means, electrical means adapted for connecting the first lamp filament at one end of said parallel circuit to a source of said firing pulses, and at least one additional resistance means connected between a point of the resistance means that is connected between one mutually adjacent pair of lamp filaments and a point of the resistance means that is connected between another mutually adjacent pair of lamp filaments.

10. An array as claimed in claim 9, in which an end of at least one of said additional resistance means is connected to said first lamp filament.

11. An array as claimed in claim 9, including further resistance means connected directly in series with at least one of said lamp filaments.

12. An array as claimed in claim 9, in which said electrical means adapted for connecting the first lamp filament to a source of firing pulses includes a resistance.

* * * * *